(12) United States Patent
Ting

(10) Patent No.: US 6,867,979 B2
(45) Date of Patent: Mar. 15, 2005

(54) DATA READING MODULE CAPABLE OF BEING BUILT IN COMPUTER OR PLUGGED INTO COMPUTER SLOT

(76) Inventor: Bang-Heng Ting, 235 Chung-Ho Box 8-24, Taipei (TW)

( * ) Notice: Subject to any disclaimer, the term of this patent is extended or adjusted under 35 U.S.C. 154(b) by 120 days.

(21) Appl. No.: 10/150,865

(22) Filed: May 20, 2002

(65) Prior Publication Data

US 2003/0214788 A1 Nov. 20, 2003

(51) Int. Cl.[7] .............................................. H05K 7/10
(52) U.S. Cl. ...................... 361/727; 361/679; 312/119; 165/80.4
(58) Field of Search ................................ 361/724–727, 361/679–687; 312/119, 223.1–223.6; 364/708.1; 165/80.4; 439/76.1, 76.2, 217–218

(56) References Cited

U.S. PATENT DOCUMENTS 5,483,419 A * 1/1996 Kaczeus et al. ............ 361/685
6,052,277 A * 4/2000 Liu et al. .................... 361/685
6,317,318 B1 * 11/2001 Kim ........................... 361/685

* cited by examiner

Primary Examiner—Hung Van Duong

(57) ABSTRACT

A data reading module capable of being built in a computer or plugged into a computer standard slot. The module comprises at least one machine seat installed in a standard slot of a computer. A frame is capable of running across the machine seat. A reading unit is placed in the machine seat. The joint of the reading unit and the connector of the frame are electrically connected; a reading unit is installed in the frame. A front side of the reading unit has a plurality of slots for being inserted by memory cards of various forms. Thereby, the data in the memory card can be read; then the read data is sent to a computer through the joint and the connector. The data in the computer is read out and then is written to the memory card through the connector and the joint; thereby, data can be transferred bidirectionally.

5 Claims, 7 Drawing Sheets

DATA READING MODULE CAPABLE OF BEING BUILT IN COMPUTER OR PLUGGED INTO COMPUTER SLOT

FIELD OF THE INVENTION

The present invention relates to data reading devices, and particularly to a data reading module capable of being built in a computer or plugged into a computer standard slot

BACKGROUND OF THE INVENTION

With the advance of digital technology, various digital products are used in the daily life, such as digital camera, or digital camera, PDA, MP3, industrial computer, and other customer applications, etc. These products are widely used and are designed well. However, since one may use various digital devices as required, and thus data are necessary to be transferred between these devices. Therefore, memory cards are developed to store data so that the data can be transferred between these devices. For various applications, the memory cards are designed with different types, such as compact flash cards (CD cards), smart media cards (SM cards), multi media cards (MMC cards), security digital cards (SD cards), memory stick cards (MS cards), magic gate cards (MG cards), micro drivers for transferring data and accessing devices. However, this induces an inconvenience for the customers. Moreover, different memory cards have problems of pin number and data formats. Thereby, this induces a problem about interfaces for converting data of different formats. As a result, the user still prepares various kinds of memory card adapter (for example, the interface card from converting memory stick card, see FIG. 8) to compact flash card for suiting different digital devices, and thus the cost is increased.

SUMMARY OF THE INVENTION

Accordingly, the primary object of the present invention is to provide a data reading module capable of being built in a computer or plugged into a computer standard slot. Thereby, various memory cards can be inserted into the data reading module so as to be connected to computer devices. As a result, data can be transferred bi-directionally and the user is unnecessary to buy various memory cards.

Another object of the present invention is to provide a data reading module capable of being built in a computer or plugged into a computer standard slot, wherein the data reading module is portable and thus the data can be carried with the user. The data reading module can be drawn out from the original connecting computer and then is inserted to another computer which has the interface suitable of the module.

Another object of the present invention is to provide a data reading module capable of being built in a computer or plugged into a computer standard slot, wherein the drawing and replacing operation of the data reading module can be completed by a push rod and a swing arm. Moreover, the present invention can be assembled rapidly with a lower cost.

To achieve above objects, the present invention provides a data reading module capable of being built in a computer or plugged into a computer standard slot. The module comprises at least one machine seat which is installed in a standard slot of a computer. A frame has an approximate U shape and is capable of running across the machine seat. A reading unit is placed in the machine seat. The reading unit has a joint at a rear end thereof and is conformable to a connector of the frame. One side of the frame has a push rod. If the push rod is pressed, a swing arm pivotally installed at a rear end of the frame is driven and then the reading unit is ejected out. Furthermore, the reading unit is placed in the frame. Thereby, the swing arm is actuated so as to push the push rod to a predetermined position. Meanwhile, the joint and the connector are electrically connected; a reading unit is installed in the frame. A front side of the reading unit has a plurality of slots for being inserted by memory cards of various forms; wherein the data in the memory card can be read by an internal circuit device; then the read data is sent to a computer by the joint and the connector; further, the data in the computer is read out and then is written to the memory card through the connector and the joint; thereby, data can be transferred bidirectionally.

The various objects and advantages of the present invention will be more readily understood from the following detailed description when read in conjunction with the appended drawing.

DETAILED DESCRIPTION OF THE PREFERRED EMBODIMENTS

Figure 1:
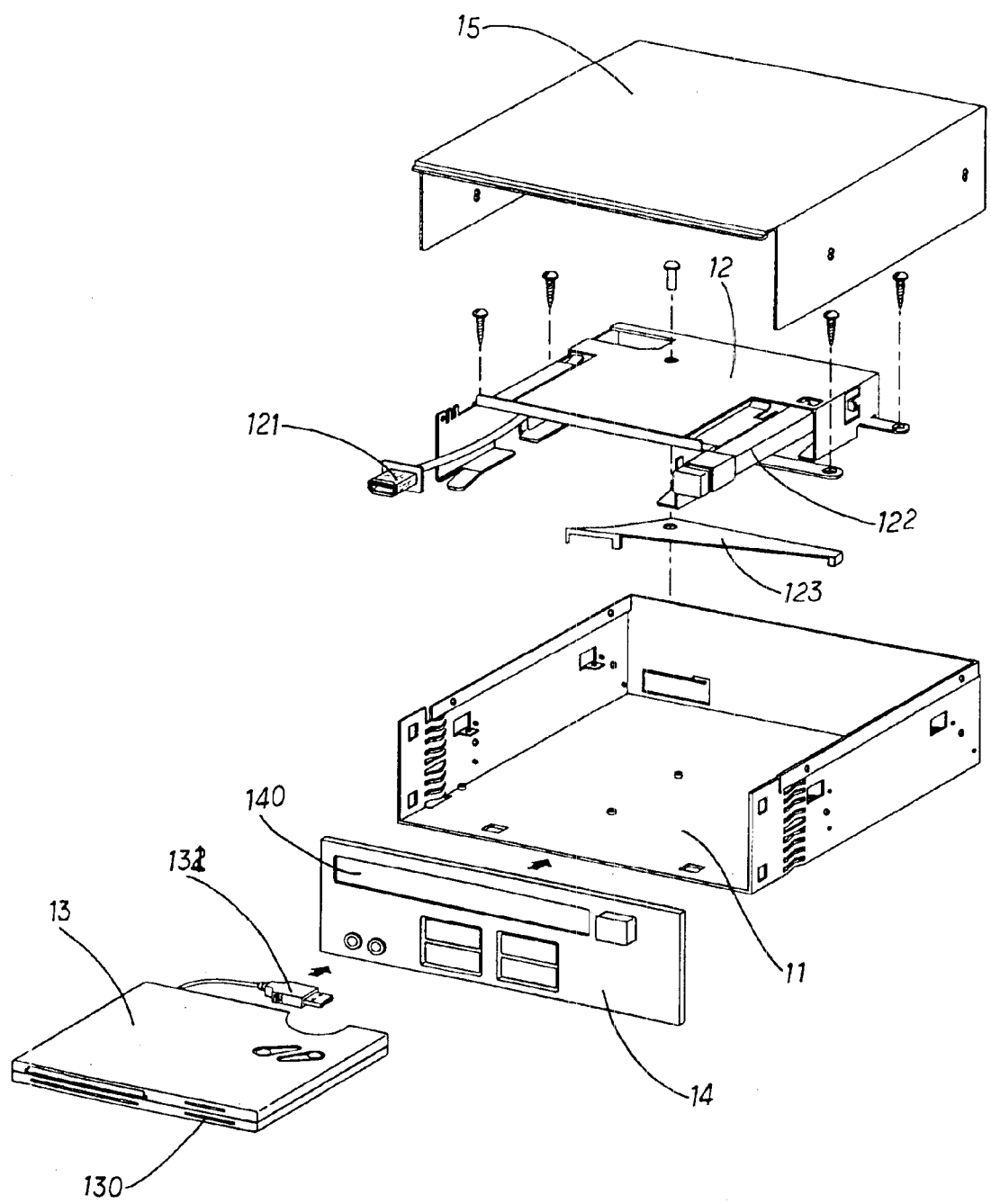
FIG. 1 is an exploded perspective view of the present invention.
Figure 2:
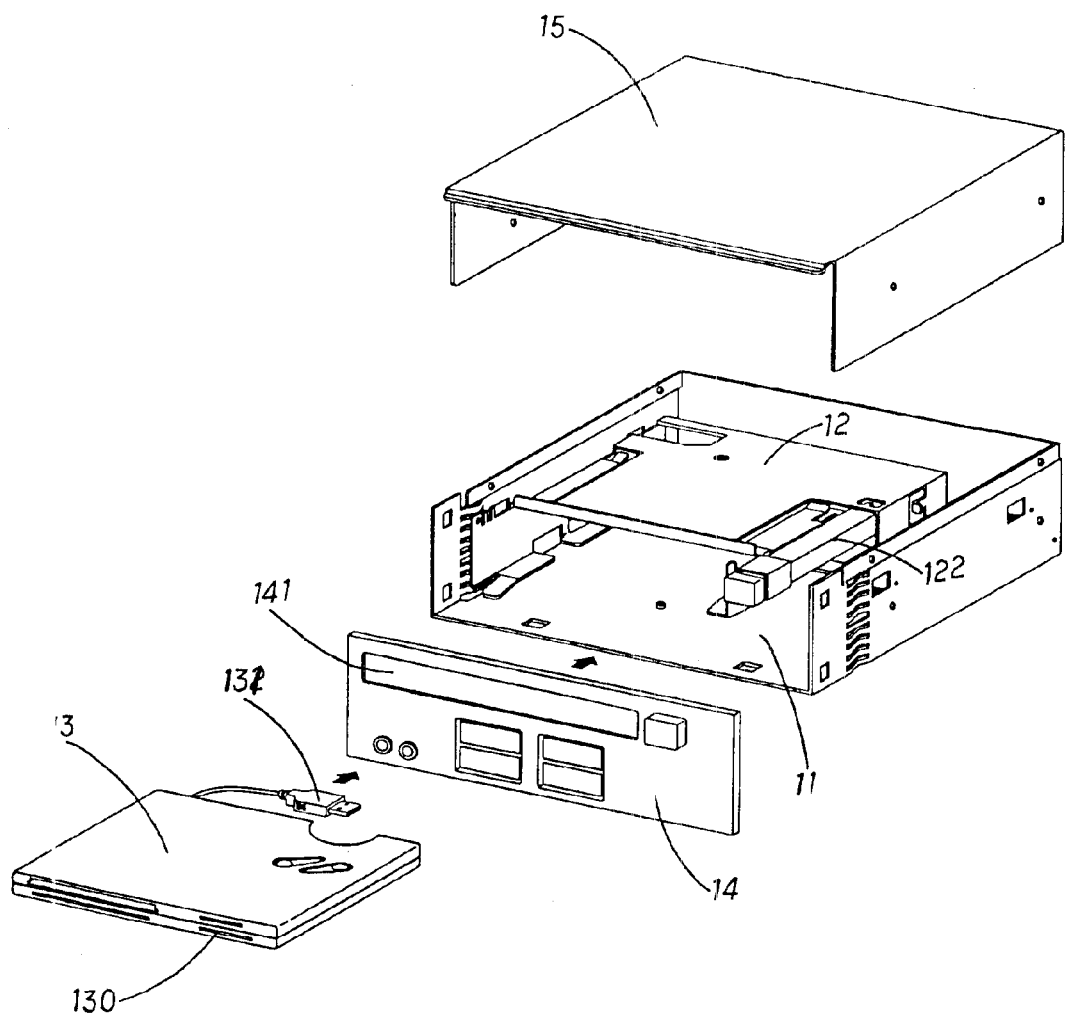
FIG. 2 is an assembled schematic view of the present invention.
Figure 4:
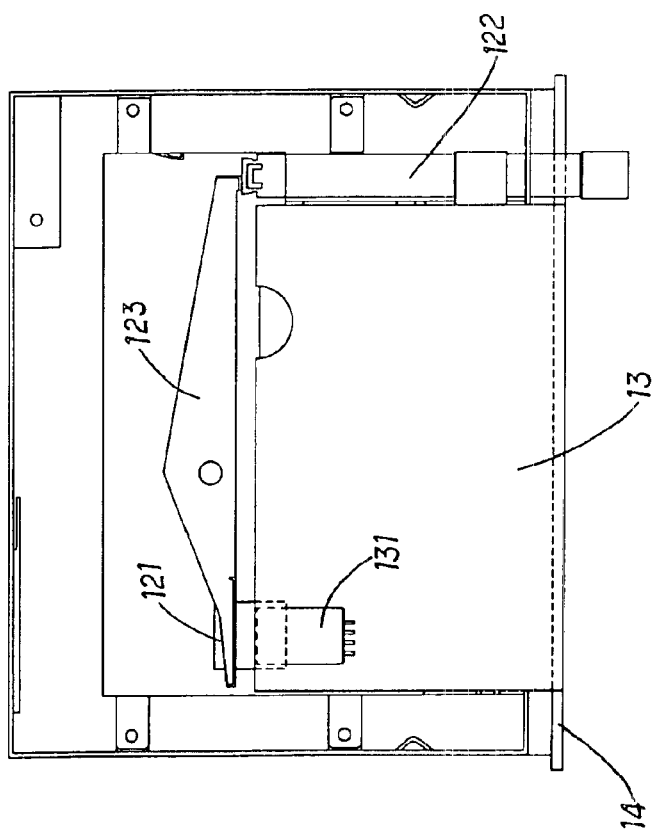
FIG. 4 is a schematic view showing that in the present invention, the push rod is pressed for ejecting the card reading unit.
Figure 5:
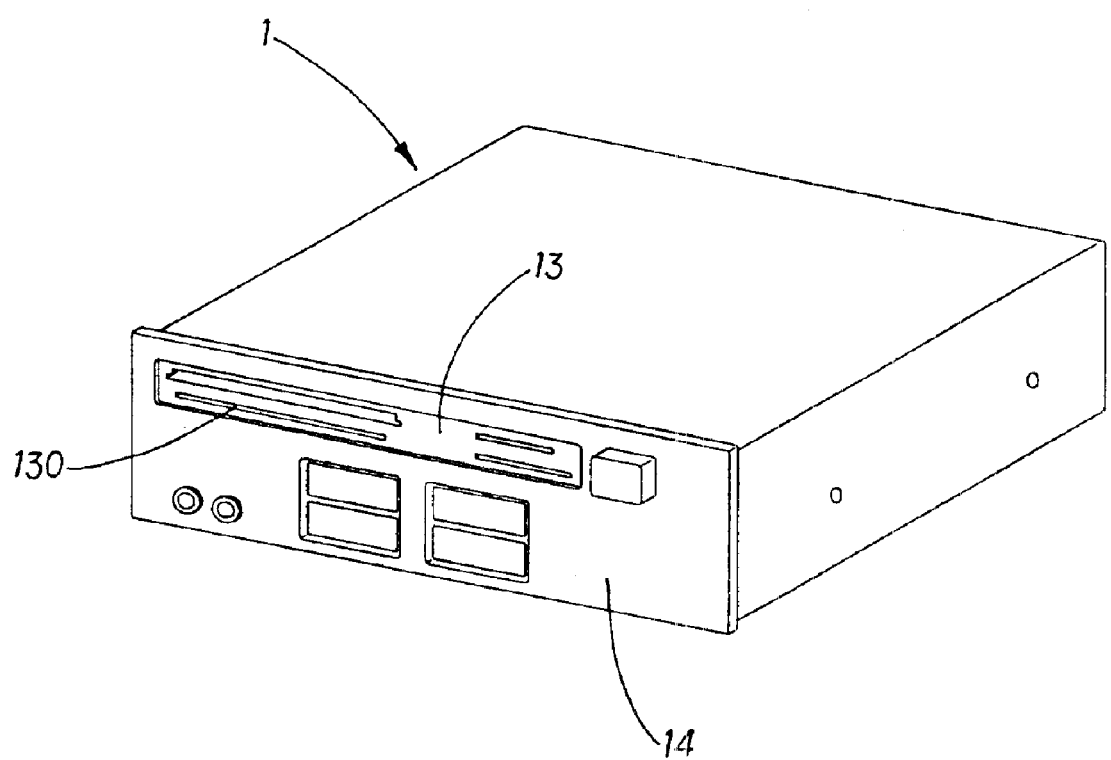
FIG. 5 is an assembled perspective view of the present invention.
Figure 6:
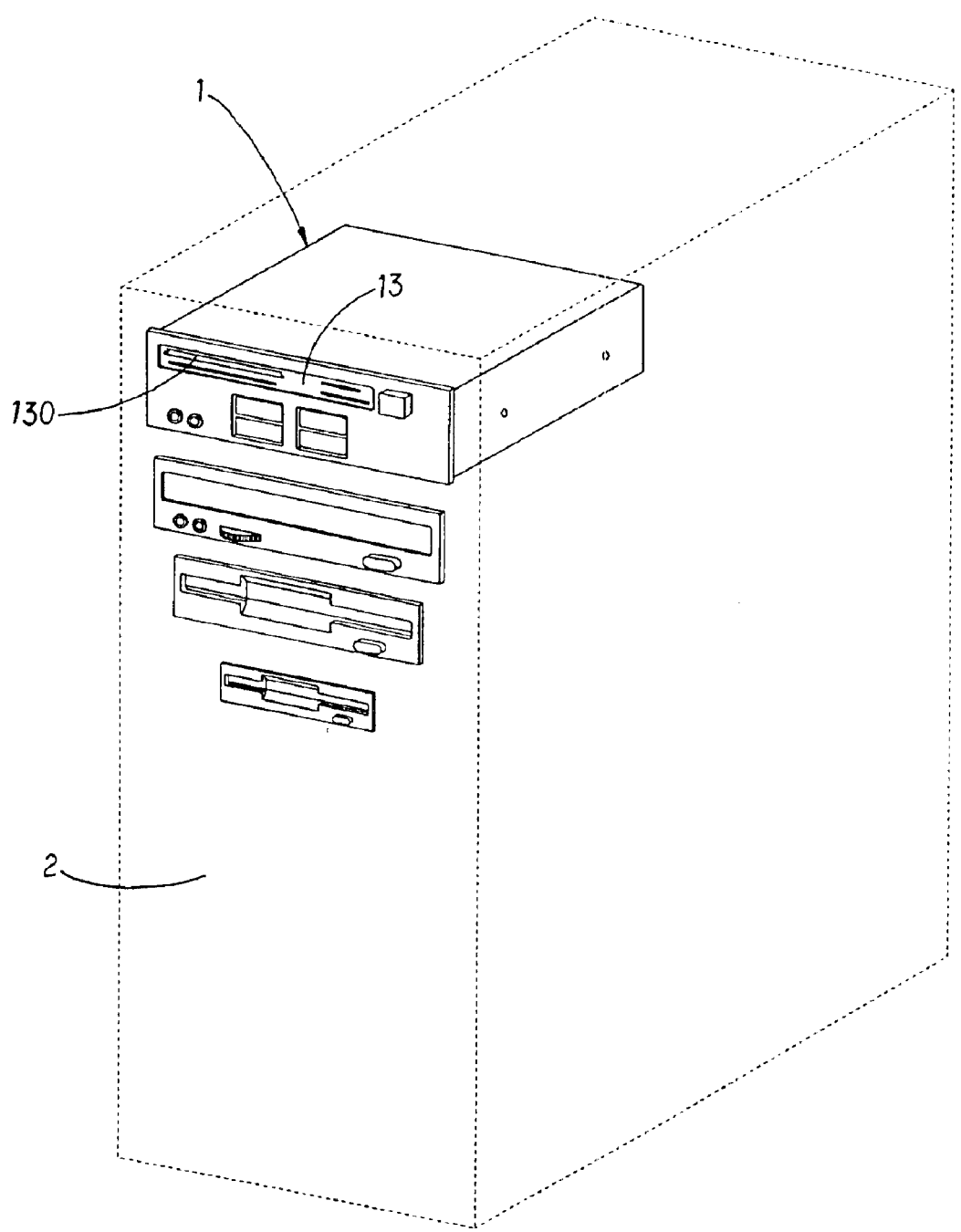
FIG. 6 shows one embodiment of the computer mainframe of the present invention.

Referring to FIGS. 2 and 4, the data reading module capable of being built-in a computer or plugged-in a computer standard slot of the present invention is illustrated. The data reading module 1 includes at least one machine seat 11 which is installed in a standard slot of a computer 2, a frame 12 having an approximate U shape and capable of running across the machine seat 11. A reading unit 13 is placed in the machine seat 11. The reading unit 13 has a joint 131 at a rear end thereof and corresponding to the connector 121 of the frame 12. One side of the frame 12 has a push rod 122. The user can press the push rod 122 and then a swing arm 123 pivotally installed at the rear end of the frame 12 is driven and then the reading unit 13 is ejected out. Furthermore, the reading unit 13 is placed in the frame 12. Thereby, the swing arm 123 is actuated so as to push the push rod 122 to a predetermined position. Meanwhile, the joint 131 and the connector 121 are electrically connected. A reading unit 13 is installed in the frame 12. A front side thereof has a plurality of slots 130 for being inserted by memory cards of various forms (not shown). The data in the memory card can be read by an internal circuit device. Then the read data is sent to a computer by the joint 131 (for example, an USB transmission interface) and the connector 121. Further, the data in the computer is read out and then is written to the memory card through the connector 121 and the joint 131. Thereby, data can be transferred bidirectionally.

A rear side of the reading unit 13 has a lead; a standby joint is installed on the lead; as the reading unit is separated from the machine seat 11. The reading unit is capable of being plugged into a computer. Thus data can be transferred bidirectionally.

Figure 3:
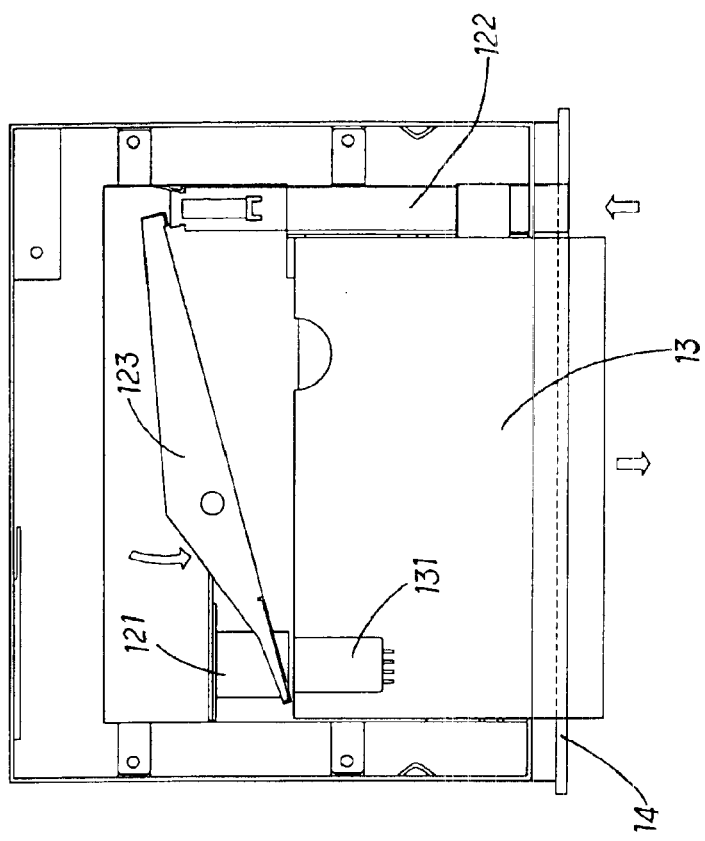
FIG. 3 is a schematic view showing the arrangement of the present invention.
Figure 7:
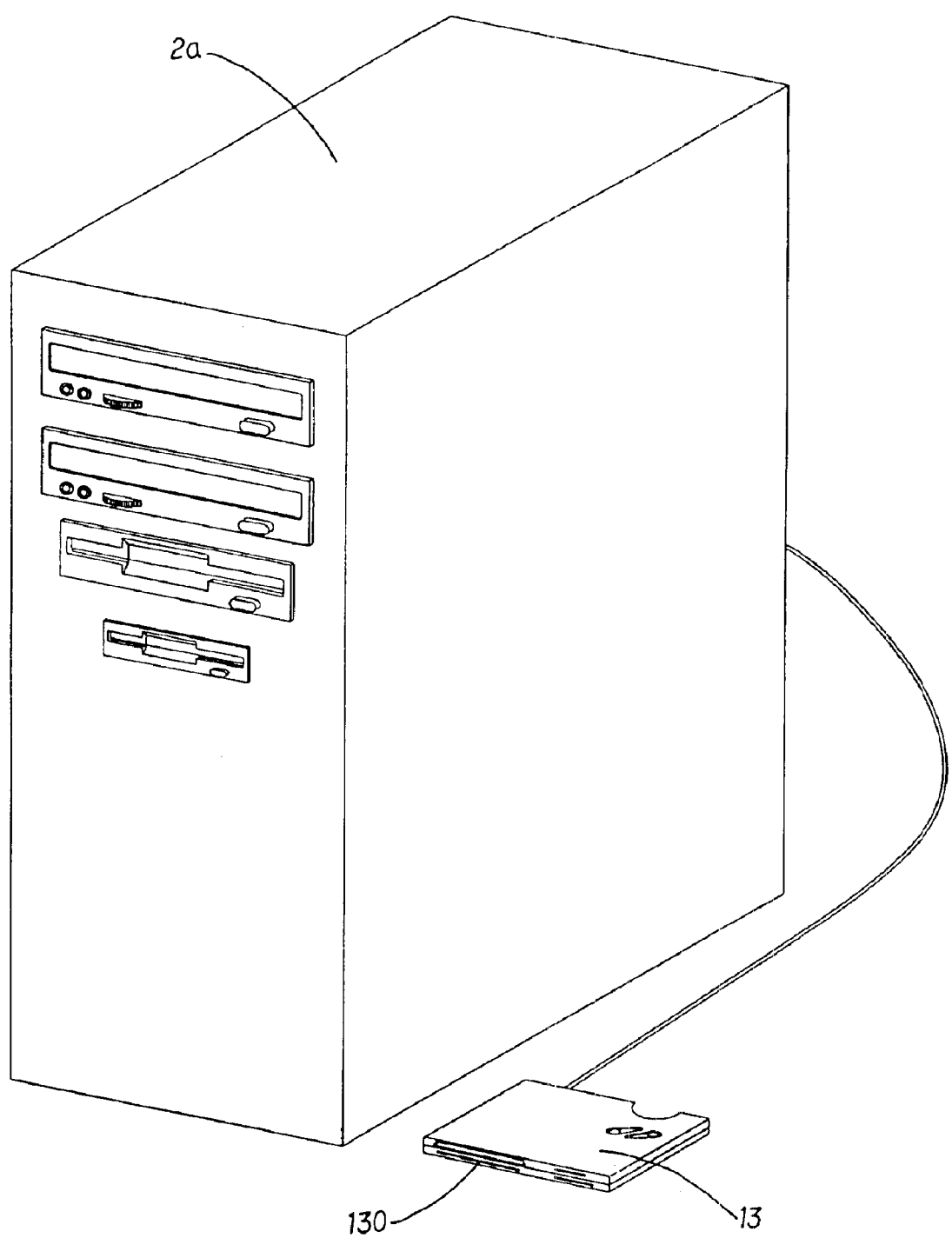
FIG. 7 shows one embodiment that the reading unit separated from a machine seat is connected to a computer not installed with a data reading module.
Figure 8:
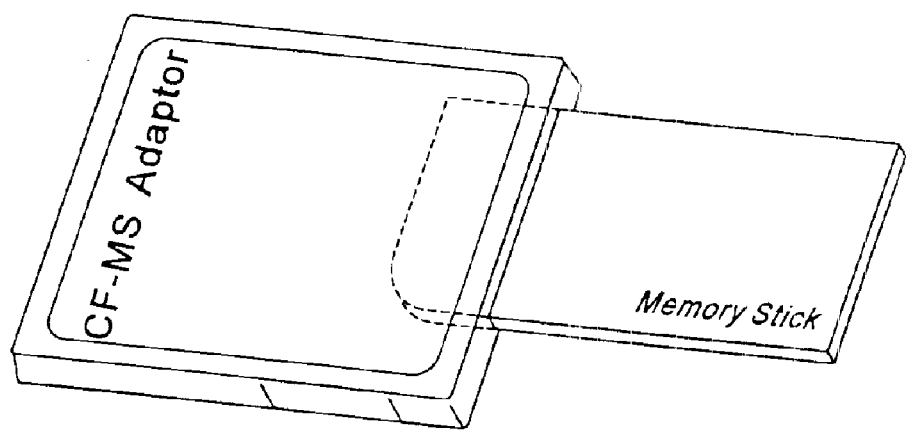
FIG. 8 is a schematic view of a prior art interface adapter.

By above components, the frame 12 can be installed to the machine seat 11. A front side and a top end thereof are installed with a panel 14 and an upper cover 15. Thereby, a data reading module 1 is formed and thus has a beautiful outlook and a strong structure. The data reading module can be placed in a standard slot of a computer 2. The reading unit 13 is placed into the frame 12 from the frame opening 141 of the panel 14 so that the joint 131 at the rear end of the reading unit 13 is electrically connected to the connector 121. When the user desires to read data from the card or access the card, the memory card can be inserted into a corresponding slot according to the form the memory card. Then, the data in the memory card can be sent to the computer 2 or the data in the computer 2 is written into the memory card. Furthermore, if the user desires to carry the data in the computer 2, the user can store the data to the memory card. Then the user takes the memory card to another computer having the data read module 1, or the memory card having the data to be read and the reading unit 13 are taken out (referring to FIGS. 3 and 7). Despite the form of the connected computer 2a or the connected transmission interface, the joint 131 at the rear end of the reading unit 13 or a standby joint 132 are plugged into the computer so that the data can be read and written bidirectionally so that the present invention can be used to various condition.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A data reading module capable of being built in a computer or plugged into a computer standard slot; the data reading module comprising at least one machine seat which is installed in a standard slot of a computer, wherein a frame has an approximate U shape and is capable of running across the machine seat; a reading unit is placed in the machine seat; the reading unit has a joint at a rear end thereof and is conformable to a connector of the frame; one side of the frame has a push rod; if the push rod is pressed, a swing arm pivotally installed at a rear end of the frame is driven and then the reading unit is ejected out; furthermore, the reading unit is placed in the frame; thereby, the swing arm is actuated so as to push the push rod to a predetermined position; meanwhile, the joint and the connector are electrically connected; the reading unit is installed in the frame; a front side of the reading unit has a plurality of slots for being inserted by memory cards of various forms; wherein the data in the memory card can be read by an internal circuit device; then the read data is sent to a computer through the joint and the connector; further, the data in the computer is read out and then is written to the memory card through the connector and the joint; thereby, data can be transferred bidirectionally.

2. The data reading module capable of being built in a computer or plugged into a computer standard slot as claimed in claim 1, wherein a rear side of the reading unit has a lead; a standby joint is installed on the lead; as the reading unit is separated from the machine seat; the reading unit is capable of being plugged into another computer; thus data can be transferred bidirectionally.

3. The data reading module capable of being built in a computer or plugged into a computer standard slot as claimed in claim 1, wherein a front side and a top end thereof are installed with a panel and an upper cover; thereby, a data reading module is formed and thus has a beautiful outlook and a strong structure.

4. The data reading module capable of being built in a computer or plugged into a computer standard slot as claimed in claim 1, wherein the joint is a USB joint and the connector is a USB connector.

5. The data reading module capable of being built in a computer or plugged into a computer standard slot as claimed in claim 1, wherein the slots in front of the reading unit are suitable for compact flash cards (CD cards), smart media cards (SM cards), multi media cards (MMC cards), security digital cards (SD cards), memory stick cards (MS cards), magic gate cards (MG cards), micro drivers for transferring data and accessing devices.

* * * * *